Figure 1:
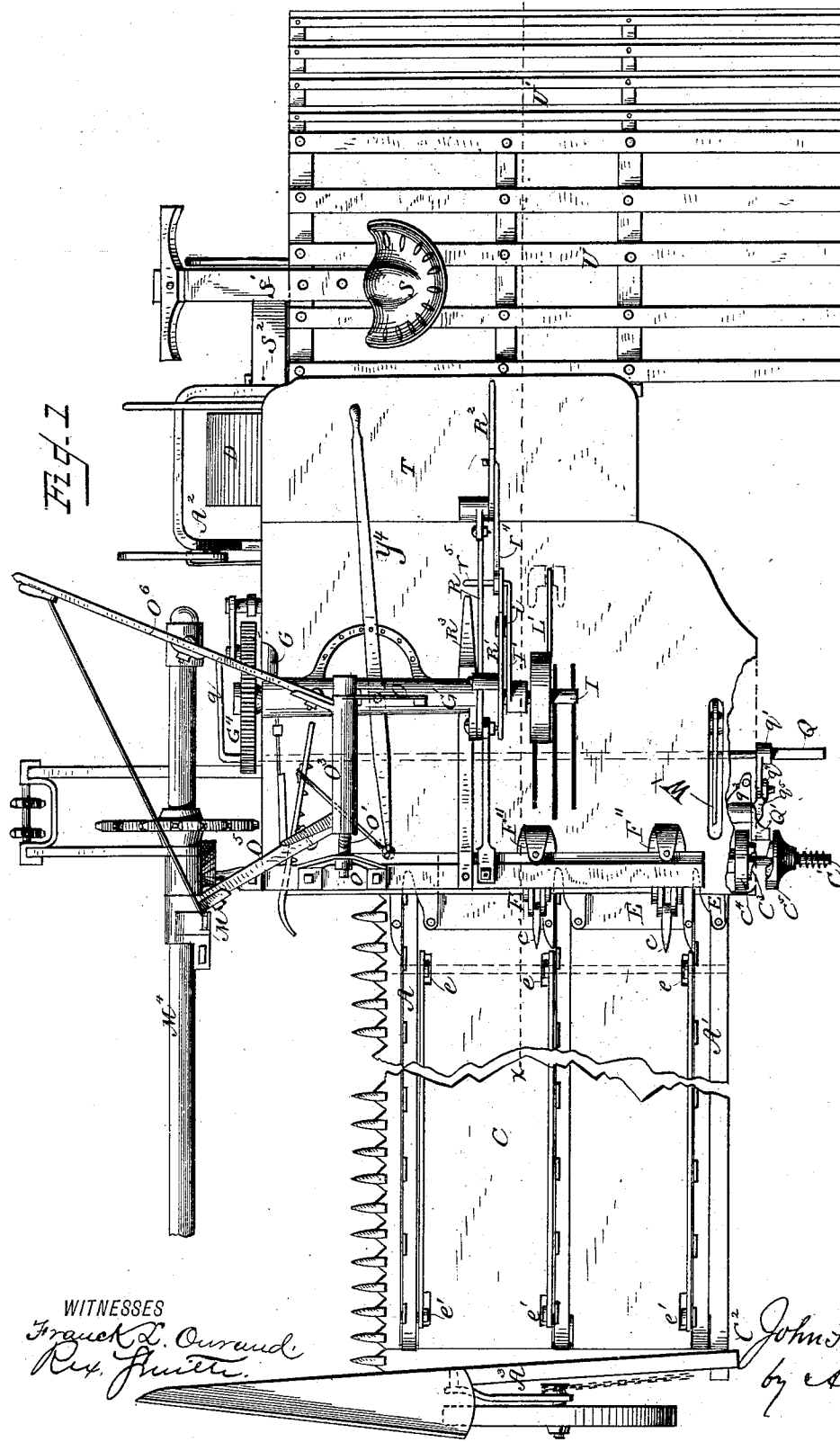

(No Model.) 7 Sheets—Sheet 1.

J. F. SEIBERLING.
GRAIN BINDING HARVESTER.

No. 310,324. Patented Jan. 6, 1885.

WITNESSES
Franck L. Ourand.
Rex. Smith.

INVENTOR
John F. Seiberling
by All Smith
Attorney

N. PETERS, Photo-Lithographer, Washington, D. C.

(No Model.)

7 Sheets—Sheet 5

J. F. SEIBERLING.
GRAIN BINDING HARVESTER.

No. 310,324. Patented Jan. 6, 1885.

WITNESSES
Franck L. Ourand
Rex. Smith

INVENTOR
Jno. F. Seiberling
by A. M. Smith
Attorney (No Model.) 7 Sheets—Sheet 6.
J. F. SEIBERLING.
GRAIN BINDING HARVESTER.
No. 310,324. Patented Jan. 6, 1885.
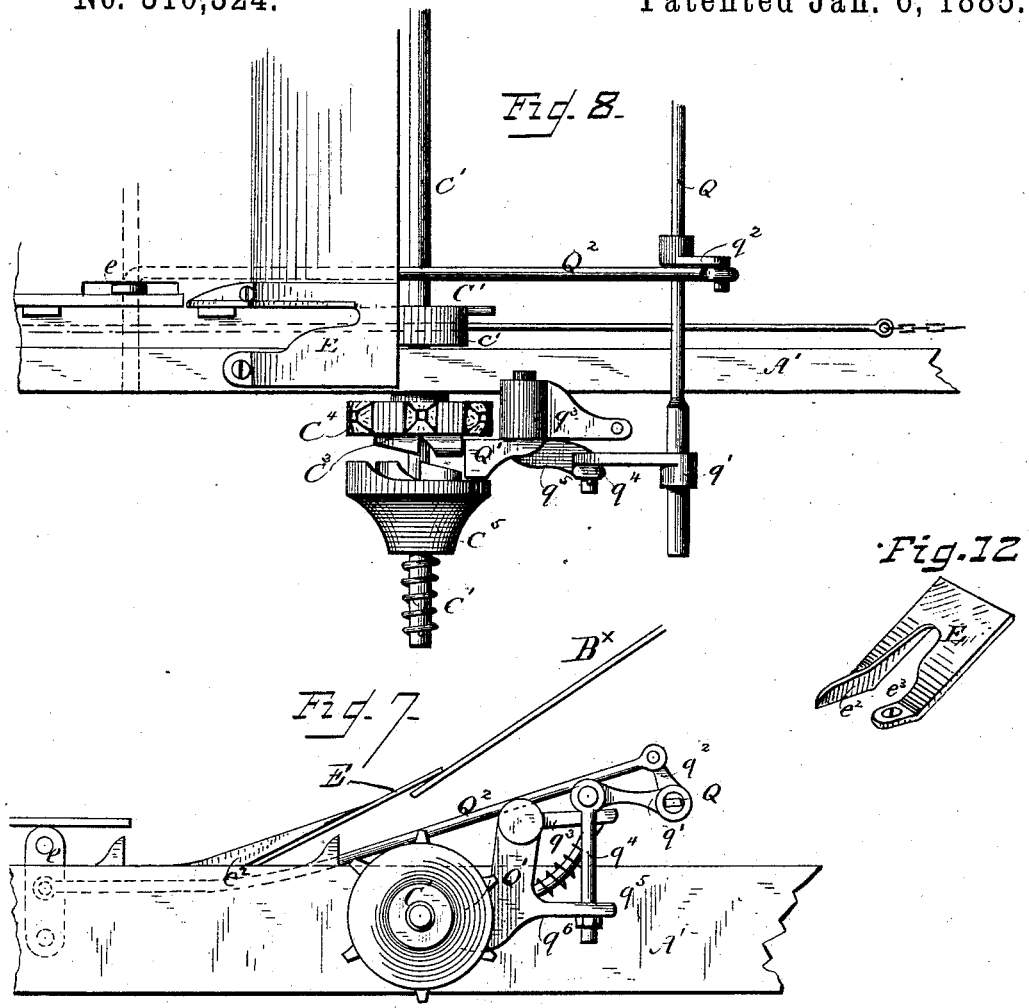
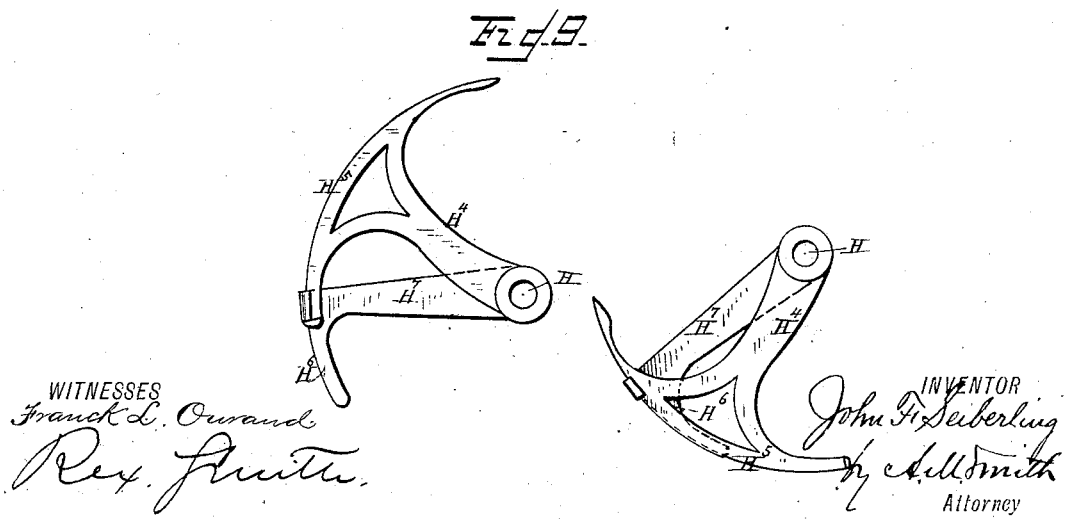

(No Model.) 7 Sheets—Sheet 7.
J. F. SEIBERLING.
GRAIN BINDING HARVESTER.
No. 310,324. Patented Jan. 6, 1885.
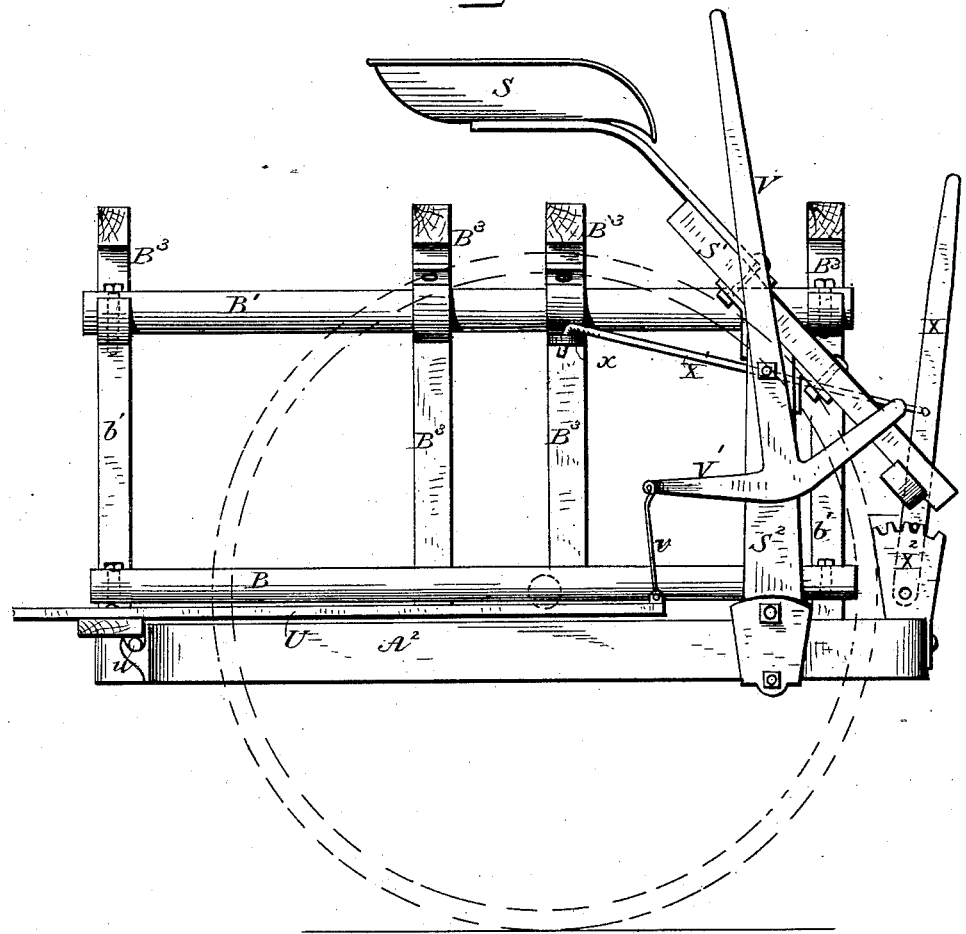
WITNESSES
INVENTOR
John F. Seiberling
by All Smith
Attorney

UNITED STATES PATENT OFFICE.

JOHN F. SEIBERLING, OF AKRON, OHIO.

GRAIN-BINDING HARVESTER.

SPECIFICATION forming part of Letters Patent No. 310,324, dated January 6, 1885.

Application filed July 5, 1883. (No model.)

*To all whom it may concern:*

Be it known that I, JOHN F. SEIBERLING, of Akron, county of Summit, and State of Ohio, have invented a new and useful Improvement in Grain-Binding Harvesters, of which the following is a full, clear, and exact description, reference being had to the accompanying drawings, making part of this specification.

My invention relates, generally, to that class of grain-binders wherein the grain is bound in its passage from the platform to the wheel upon the grain side thereof; and the improvements consist in the combination, with pickers, inclined table, packers, and binder-arm, of an oscillating arm operated from beneath the inclined table, at the rear end thereof, beyond the reach of the overhanging pickers.

My improvements also consist in the inclined binder-table and grain-carriers, arranged as described, the former adjustable upon the inclined tooth-clearers without obstructing the teeth of the grain-carrier; in the combination of the inclined table, the grain-carrier, the inclined tooth-clearers, and pickers arranged above the foot of the inclined table to receive the grain from the tooth-clearers.

My improvements also consist in novel mechanism for stopping and starting the platform-belts simultaneously with the stopping and starting of the binder-needle; in a novel mechanism for stopping and starting the pickers, arranged at the foot of the inclined binder-platform, simultaneously with the starting and stopping of the binder-needle; in connecting said platform-carrier or belt mechanism and the pickers with the reel-operating gearing, so that the reel may be continuously operated when the other mechanisms are disconnected.

My improvements also consist in a novel construction of needle-arm guard, whereby it is made extensible to admit of its arrangement within a confined or limited space below the inclined binder-table.

My improvements also consist in a novel arrangement and combination of a lever connected with the tripping mechanism, and a stop or detent upon the gearing for actuating the needle-arm and knotter, to prevent the knotter from repeating or making a second vibration caused by the rebound of the tripping mechanism heretofore employed.

My improvements also consist in a novel construction and arrangement of bundle delivery and discharge arms, suspended above the inclined table and operated by the knotter-actuating shaft to lift the bundle after it has been bound up the inclined table and discharge it therefrom; in a peculiarly-formed lever operated upon by the delivery-arm, to both push the discharge-arm forward and withdraw it to its normal position; in combining with said delivery and discharge arms a spring-detent, to engage with the discharge-arm and hold it above the path of the bundle while the delivery-arm is raising the bundle within its reach.

My improvements also consist in the combination and arrangement of the inclined table upon the grain side of the drive-wheel, the shelf and bundle-discharge arm arranged above the drive-wheel, and the driver's seat supported on the main frame upon the stubble side and in front of the drive-wheel axle to overhang the space in which the bundle is ejected.

My improvements also consist in a reel-standard supported on the platform or inside shoe, and a reel-shaft adjustable vertically upon the end of reel-standard, and held in position in a novel manner by braces supported upon the binder-frame; in combining the said devices and connecting the braces to the binder-frame by a hinged adjustable support, and providing said braces with a hand-lever and means for adjusting the reel both vertically and longitudinally.

My improvements also consist in an inclined adjustable binder-table and pickers, in combination with a butter operated jointly and intermittently with the pickers; in an improved butter formed of a bar operated by gearing to receive an oscillating endwise movement, provided with fingers at the lower end, and a wing-board hinged at the lower end of said bar, and connected at its upper end to an adjusting-lever, whereby the butter may be adjusted to suit varying lengths of grain, and in a butter constructed as above described, and connected to the main frame and adjustable binder-frame in a peculiar manner, to admit of the adjustment of the movement or throw of the butter as well as the adjustment of the binder-table.

Figure 2:
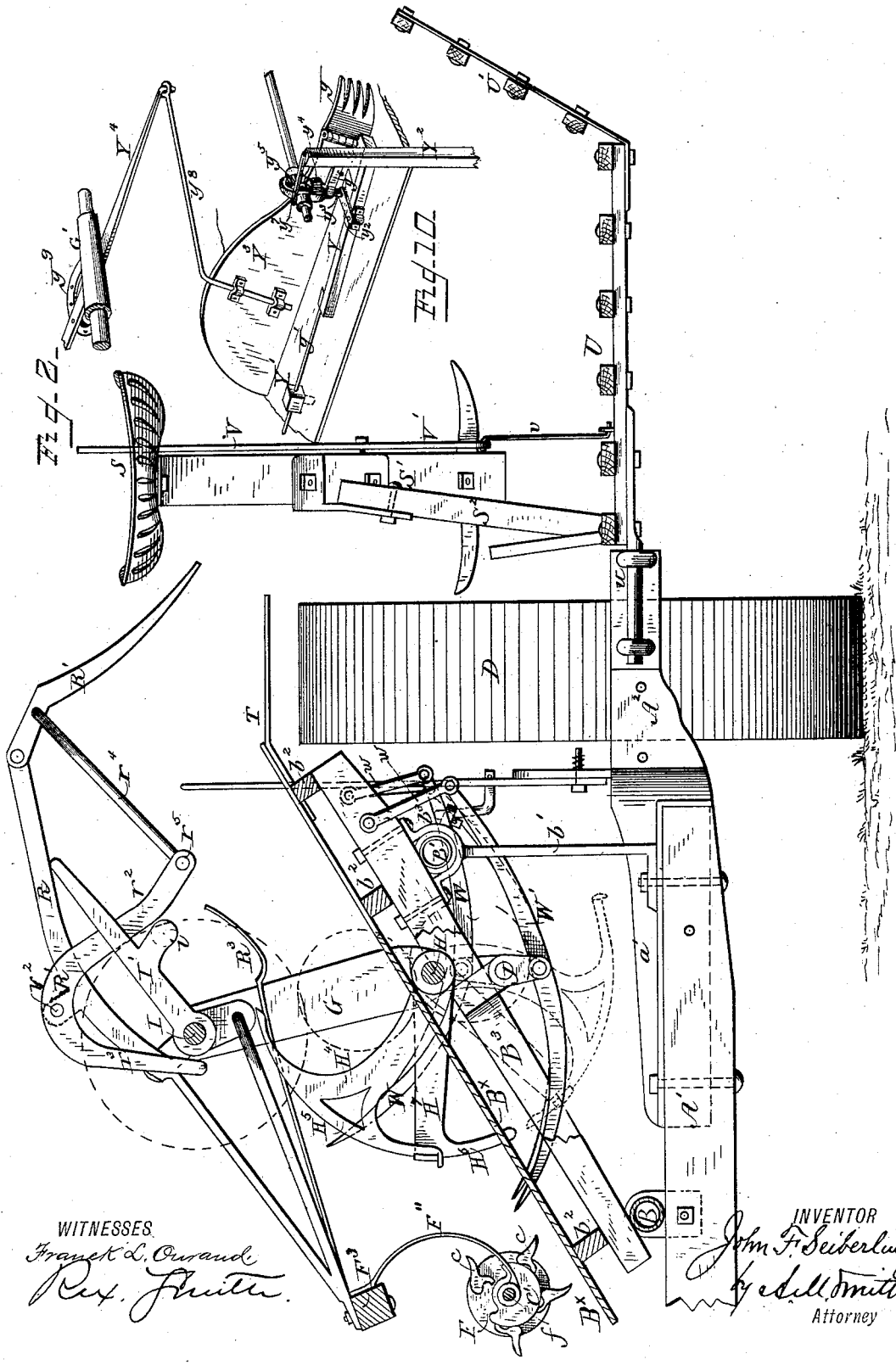
Figure 3:
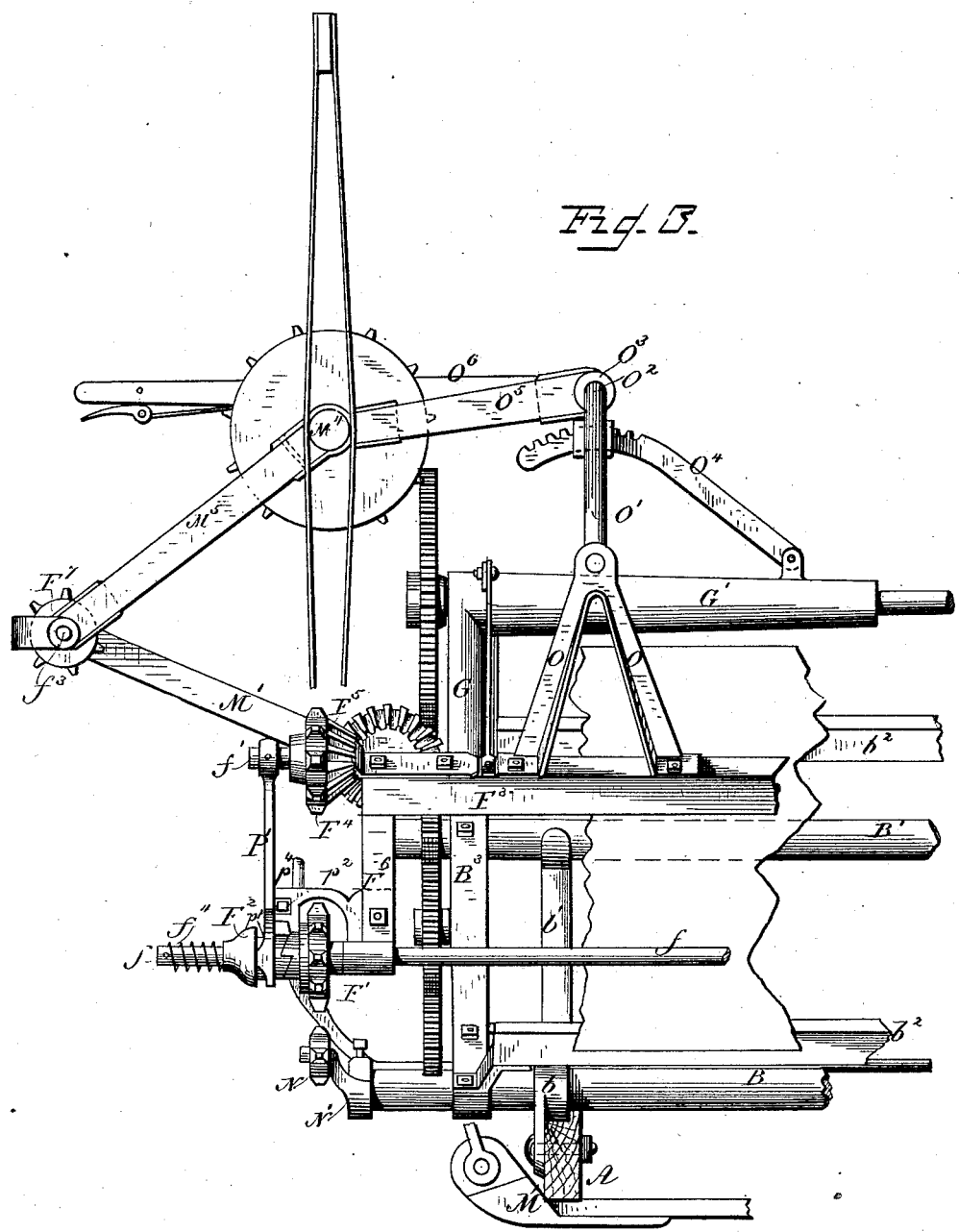
Figure 4:
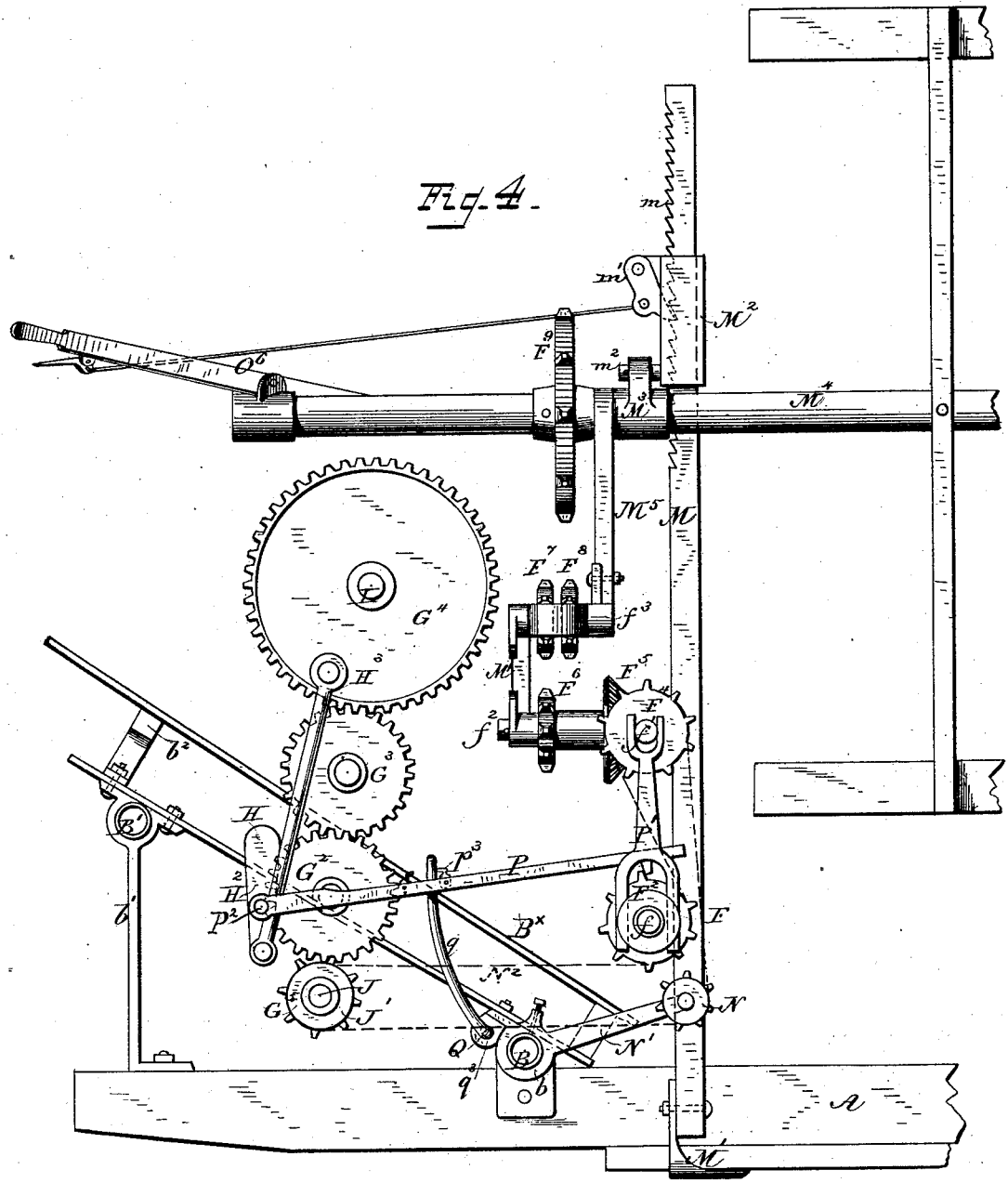
Figure 5:
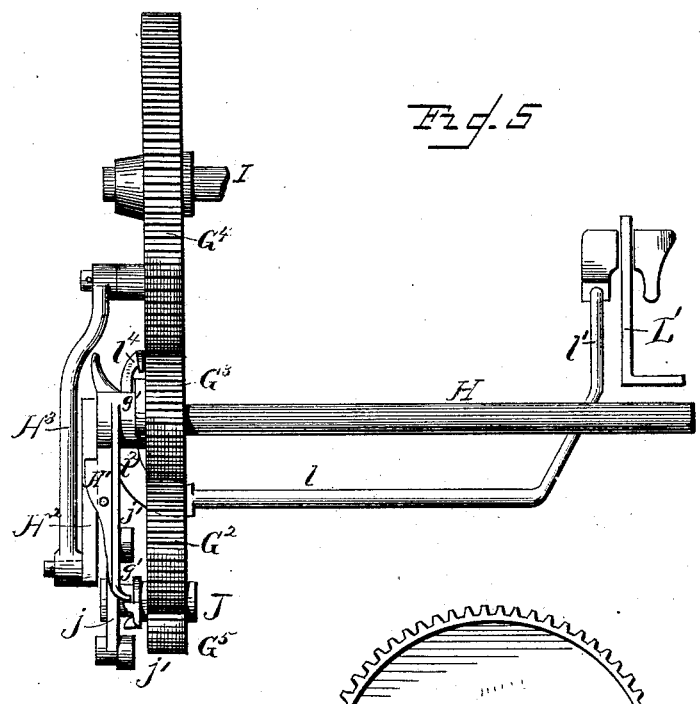
Figure 6:
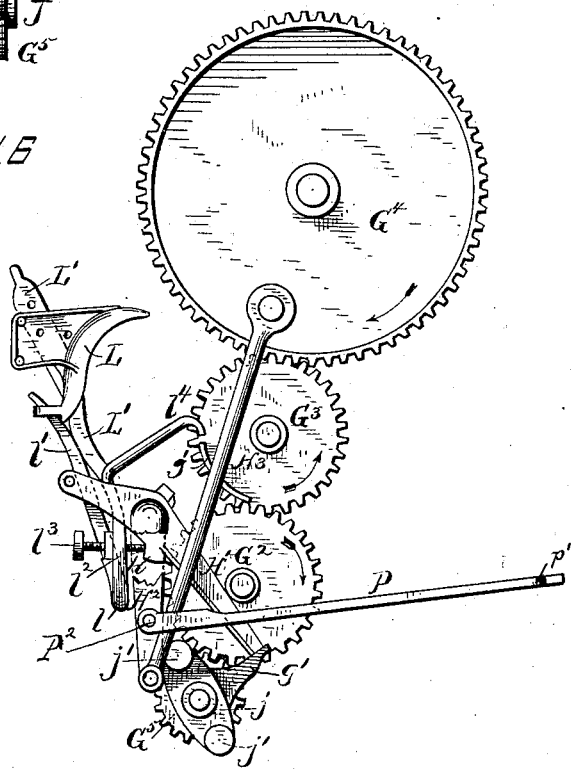

In the accompanying drawings, Figure 1 is a plan view of a harvester and binder constructed according to my invention, showing the platform broken away. Fig. 2 is a transverse vertical section in line $x\,x$ of Fig. 1. Fig. 3 is a side elevation of the gear-standard and frame, the reel supported and adjusted thereon, and gearing for operating the reel and binder mechanism, looking toward the stubble side of the wheel. Fig. 4 is a front elevation of the devices shown in Fig. 3; Figs. 5 and 6, a side and front elevation, respectively, of the tripping devices of the binder mechanism upon an enlarged scale; Figs. 7 and 8, a side elevation and plan of the devices for operating the carriers and tooth-guards to throw them into and out of action. Fig. 9 is a view in elevation of the expanding needle-arm detached; Fig. 10, a perspective view of the butter and its connections detached; Fig. 11, an elevation from the stubble side of the machine, showing part of the frame-work, and also showing the hand-levers and their connections for adjusting the binder-frame and tilting the tray; and Fig. 12, a perspective view of one of the tooth-clearer plates.

In this type of machine the grain falls upon the platform, and is carried to the stubble side thereof by an endless apron or carrier, and then passed over an inclined binder-table, upon which it is bound, the binding mechanism here employed being, preferably, of the Appleby pattern. The bundle is discharged from the binder-table over the drive-wheel upon a bundle-carrier arranged upon the stubble side of the machine, that may be tilted at suitable intervals to drop them from the machine in windrows convenient for shocking and gathering.

The main frame of the machine is formed of transverse sills A A', arranged, respectively, at the front and rear edges of the platform. A longitudinal bar, $A^3$, supports the grain ends of the platform-sills A A', and the stubble ends of said sills are secured to brackets $a\,a'$, bolted to the front and rear ends of a rectangular wrought-iron frame, $A^2$, that encompasses the drive-wheel, and suspended adjustably from the axle of said wheel. The grain end or longitudinal bar is supported adjustably upon a grain-wheel in any well-known manner, and need not be shown herein. Longitudinal tubular bars B B' are firmly secured to the sills A A', between the grain-platform C and wheel D. The bar B is held by brackets or straps $b$, to rest upon or nearly upon a level with the sills, and the bar B' supported at a suitable elevation above the sills upon iron brackets $b'$, bolted securely to the sills A A', and also to the brackets $a\,a'$ of the wheel-frame. The binder-frame is formed with longitudinal bars $b^2\,b^2$ and transverse main binder-sills $B^3\,B^3$, that rest upon and are secured adjustably to the longitudinal bars B B' by loops or straps $b^3$ and clamping-bolts that pass through the sills and straps. The platform C is provided with endless belts or carriers of well-known construction, formed with upturned teeth upon their front edges, that pass over rollers C' $C^2$, arranged, respectively, upon the grain and stubble sides of the platform. The lower edge of the inclined platform extends to the plane of the upper side of the platform, and inclined tooth-clearers E, bolted to the platform-sills, overlap both the inner end of the platform and the lower end of the inclined binder-table $B^\times$, so that the binder-table may be adjusted upon the bars B B' without obstruction from the teeth of the platform-carriers. The clearers are formed with an enlarged mouth, $e^3$, and an upturned inclined flange, $e^2$, that bears closely against the teeth of the carriers and clears them of grain before the teeth are turned downward around the end roller or shaft, C', upon their return to the grain end of the platform. The inclined tooth-clearers E also serve to raise the grain from the platform fairly up the foot of the inclined binder-table $B^\times$ within reach of the pickers F, secured to a shaft, $f$, arranged above the foot of the inclined binder-platform, and supported by brackets and picker-teeth clearers F''', suspended from a picker-sill, $F^3$, supported at the front end of the machine—in this instance to the binder-gear standard G. The picker-shaft is driven in a manner hereinafter described, and the pickers are formed with teeth $c$, hinged to disks secured to the picker-shaft, and provided with a cam-plate, $c'$, upon which the ends of the teeth $c$ press as they revolve, and are thus permitted to sweep over or follow the surface of the inclined table and deliver the grain fairly to the packers W W, arranged beneath the inclined binder-table, as will hereinafter be explained. The needle-arm shaft H and knotter-actuating shaft I are supported, one to project under and the other to project over the binder-frame longitudinally about one-half its length, by a double tubular bracket, G', secured to the gear-standard G, and connected by a chain of gear-wheels, $G^2\,G^3\,G^4$, with a gear-pinion, $G^5$, on the main binder-shaft J, that is operated upon by a clutch and trip mechanism similar to that of the Appleby machine. The gear-standard is bolted securely to the front binder-sill, $B^3$, and is adjustable on the tubular bars with the binder-frame in the manner above described. The main binder-shaft J is provided with a cross-head, $j$, upon its end, the outer ends of said bar being provided with friction-rollers $j'\,j'$, that freely revolve upon pins, and are intercepted by a pivotal clutch, $g'$, upon the gear-pinion $G^5$ when said clutch is released from the tripping-lever H', journaled to the end of the needle-arm crank $H^2$, and normally held in proper relation thereto by a spring connecting the lever and crank or the lever and needle-arm shaft. The train of gears is set in motion by tripping the lever H' in any well-known manner, and the gear $G^4$ of the largest diameter is connected by a pitman, $H^3$, with the crank $H^2$ on the needle-arm shaft, and imparts an upward and backward oscillation to said shaft and needle-arm at each revolution of the gear-wheel. When the bundle is bound, the tripping-lever H' is released and falls down to again intercept the clutch and suspend the action of the needle and knotter-gearing. The tripping-lever H' is preferably acted upon by a rock-shaft, $l$, provided with two arms, $l'$ $l^2$, extending therefrom. One of said arms, $l'$, projecting toward the stubble side of the machine, passes through the heel of a trip-finger, L, pivoted to the compressor L', and holds the trip-finger away from the compressor until the grain has been packed against it sufficiently to form a bundle. The trip-finger will then have been pressed back against the compressor with considerable tension, and a shoulder, $h$, upon the tripping-lever H' will be pressed against by a set-screw, $l^3$, passing through the arm $l^2$, to lift the tripping-lever above the clutch and start the train of gearing, and with it the needle and knotter-actuating shaft. When the bundle is bound and delivered above the compressor, the compressor and trip-shoe are moved quickly back to their normal position, usually with such force as to rebound and allow the set-screw $l^3$ to strike the trip-lever H' and again disengage it from the clutch-arm on the gear $G^5$, and allow the gearing and said needle-arm and knotter-actuating shaft to repeat their movements before another bundle is formed. This double action or second vibration is effectually prevented by extending the lever $l^2$ and forming a hammer, $l^4$, upon the end thereof, that strikes upon a stop-plate, $g'$, secured to the gear-wheel $G^3$, immediately before said wheel completes its movement, so that at the completion of the movement the hammer and tripping-lever will have but little further movement to make, and a recoil is thereby prevented.

A sprocket-wheel, J', is keyed to the outer end of the main binder-shaft, and a similar sprocket-wheel, F', is secured to the end of the picker-shaft $f$, to turn loosely thereon when disengaged from a clutch, $F^2$, keyed to slide longitudinally upon said shaft. A sprocket-wheel, $F^4$, is freely journaled to a stud-axle, $f'$, bolted to the front end of the picker-sill $F^3$, and has a beveled gear, $F^5$, formed upon its face, that transmits motion to the reel-shaft, as will hereinafter appear. An idle sprocket-pinion, N, turns freely upon a pin secured to the end of an arm, N', that is adjusted upon and secured in any desired position by a set-screw. An endless chain, $N^2$, passes around the sprocket-wheels J' F' $F^4$ and idler-pinion N, and drives them from the main binder-shaft, and as the pinion N is adjustable the chain may at all times be kept taut. A reel-post, M, is pivoted to the shoe M' of the main frame or sill A, and is formed with ratchet-teeth $m$ at its upper end, by which means a sleeve, $M^2$, provided with a hinged pawl, $m'$, may be adjusted vertically upon said post. The sleeve $M^2$ is provided with a pin, $m^2$, to which a collar, $M^3$, supporting the reel-shaft $M^4$, is hinged. The reel-shaft has additional support upon the binder-frame, and is adjusted both vertically and horizontally, as will hereinafter appear. To admit of such adjustment without varying the length of the driving-belts, the reel-shaft is connected to the conveyer-sill $F^3$ of the binder-frame in the following-described manner: A stud-axle, $f'$, secured to the front end of the picker-sill, carries a beveled wheel, $F^5$, and sprocket-wheel $F^6$, secured together to revolve freely upon the stud-axle $f^2$. A link, M', connects the stud-axle $f^2$ with a shaft, $f^3$, upon which sprocket-pinions $F^7$ $F^8$ freely turn. The shaft $f^3$ is also connected by a link, $M^5$, with the reel-shaft $M^4$, and a sprocket-pinion, $F^9$, secured to the reel-shaft, is connected by a chain to the sprocket-pinion $F^8$ on shaft $f^3$, and sprocket-wheel $F^7$ is connected in a similar manner, by an endless chain, with the sprocket-wheel $F^6$, and as the sprocket-wheel $F^6$ is driven continuously by gearing and belt connections with the main binder-shaft J, the linked connections will admit of a vertical adjustment as well as horizontal movement of the shaft J without loosening or disconnecting the driving-gear.

In order to secure the adjustments of the reel above referred to, said reel is connected with the binder-frame in the following manner: A bracket, O, secured to the conveyer-sill $F^3$, supports the cranked end of a link, O', the upper end of which is bent at right angles thereto, and provides a horizontal shaft, $O^2$, upon which a sleeve, $O^3$, is journaled. The shaft $O^2$ is supported upon its outer end by a rack bar or bracket, $O^4$, hinged to the upper arm of the tubular bracket G', that may be raised or lowered to be adjustably secured to the bearing at the end of the shaft $O^2$. The reel-shaft is connected to the sleeve $O^3$ by arms $O^5$ $O^6$, diverging from the ends of said sleeve, to afford a long bearing for the support of the reel-shaft, and, furthermore, project the arm $O^6$ diagonally across the binder-table within reach of the driver from his seat, and will serve both as a lifting-lever to adjust the reel vertically, and also as a thrust-lever to admit of its horizontal movement and adjustment. Suitable locking pawls or catches, actuated by strings extending to the handle end of lever $O^6$, will serve to hold the reel firmly in its position upon the bracket, or admit of its readjustment thereon by the driver without leaving his seat.

The pickers, platform, grain-carriers, and tooth-guards may be thrown into and out of gear, to render them operative or inoperative to act in conjunction with the binder needle-arm, by the following-described means: A rod, P, is connected to the needle-shaft arm $H^2$ by a pin, $P^2$, and is beveled or wedge-shaped at $p'$ on the outer end thereof, and held to slide in a guide-bracket, $p^4$, secured to the bracket $F^6$, that supports the front end of the picker-shaft. A lever, P', is forked at the upper end to embrace the stud-axle $f'$, and is pivoted to the end thereof and pendent therefrom, so that its lower end will swing longitudinally with the machine, and, being forked at its lower end to embrace a clutch, $F^2$, on the picker-shaft, will, when vibrated, move said clutch upon the shaft, to engage and disengage with a similar clutch upon the face of the sprocket-wheel F'. The clutch F² is held against the face of the sprocket-wheel F' when not otherwise acted upon by a spiral spring, $f^4$, that envelopes and is secured to the end of the picker-shaft $f$. The clutch F² turns with the shaft $f$, and is allowed to slide longitudinally thereon by a feather or key in a well-known manner, so that when the clutch and sprocket-wheel are engaged the shaft may be revolved with the sprocket-wheel. When it is desired to stop the movement of shaft $f$ and pickers F while the needle is raised and the knot is being tied upon the bundle, the clutch is disengaged from the sprocket by the thrust of the rod P, actuated by the needle-shaft arm H² at the beginning of its movement, that bears against the rear side of the lower end of the pendent lever P', and forces it, together with the clutch, away from the face of the sprocket-wheel, thereby stopping the action of the conveyer while the needle-arm is raised, so that the grain will not be packed against it. To further facilitate this object, the movement of the platform-carriers is suspended, and the grain is raised above the same by the tooth-guards at the same time that the movement of the pickers is suspended by means of a rock-shaft, Q, journaled to bearings secured to the adjustable binder-platform frame or gear-standard G, and provided at its front end with an upturned arm, $q$, that is acted upon by fingers $p^3$ on the sliding rod P, to oscillate with the needle-shaft. The rear end of the rock-shaft Q is flattened and slides freely through brackets $q^3$, secured to the platform-frame, to permit the rock-shaft to move with the adjustable gear-standard G. The rear end of the rock-shaft Q also passes through crank-arms $q'$ $q^2$, and may be adjusted thereon to accommodate them to the adjustment of the binder-frame. The arm $q'$ is connected by a vertical rod, $q^4$, with the projecting finger $q^5$ of a swinging cam or dog, Q', that is pivoted to a bracket, $q^3$, on the sill A', and is vibrated upon its pivot by the movement of the arm $q'$ with its rock-shaft. A coiled spring, $q^6$, surrounds a curved pin connecting the free end of the dog Q' with the bracket, that serves to hold the dog down and press its face against the shaft C' of the platform-carrier. A clutch, C³, formed upon the rear face of a sprocket-wheel, C⁴, driven by a belt continuously from gearing connected with the driving-wheel, is journaled to the end of shaft C', to turn freely thereon when not otherwise engaged, and a clutch, C⁵, keyed or feathered to the end of said shaft C', to revolve therewith and be allowed to move longitudinally thereon, is ordinarily held to engage with the clutch of the sprocket-wheel, and thereby cause the revolution of said shaft by means of a coiled spring secured to the end of the shaft to press against the said clutch. The clutches are separated by the oscillation of the wedge-shaped end of the dog Q', that presses against the sprockets when the rock-shaft Q is oscillated and the needle-arm commences its movement, and the movement of the platform-carrier is thereby suspended. The tooth-guard bars extend completely across the platform from the grain to the stubble side thereof, and are suspended upon the ends of links $e$ $e'$, pivoted to the platform-frame, and so arranged as to move closely against the sides of the toothed belts or carriers. The links $e$ upon the stubble end of the platform are connected to the arms $q^2$ of the rock-shaft Q by the pitman-rod Q², so that when the needle-shaft arm H and the rock-shaft Q are oscillated the tooth-guard bars are swung up and lift the grain that rests upon the platform above the carrier-teeth, so as to be out of their reach. The grain is thus withheld from further movement by suspending the operation of the carrying devices until the needle falls below the platform to receive a new bundle. The needle is arranged to fall below the platform, and is constructed in a peculiar manner to admit of its compact arrangement within a limited space without limiting the length of its movement, as follows: The needle-arm H⁴ is of the usual form, and is provided with a segment-shaped guard, H⁵, that serves as a cut-off to prevent the grain from being packed behind the needle-arm and thereby intercept its return movement. The heel end of the needle-guard is extended by a separate segmental plate, H⁶—in this instance secured to an arm, H⁷, that is freely journaled to the shaft H, and allows the plate H⁶ to move upon or fold against the guard H³ when the needle-arm is dropped below the platform, and may be withdrawn therefrom to form an extension of said guard when the needle is raised to its full extent. An upper compressor, L', above referred to, may be arranged upon the binder-table above the needle-arm, and a revolving delivery-arm, I', secured to the knotter-actuating shaft I in a well-known manner. A bracket, R, is hung upon the end of the upper sleeve, G', of the bracket G, and is firmly braced above and below the sleeve by a double-armed brace, T T', secured at its opposite end to the conveyer-rail F³. The bracket R projects across the machine, so that its end will come above the inner edge of the drive-wheel, and forms a support for a lever, R', swung upon a pivot, $v^2$, on the bracket, and provided with downwardly-projecting arms $r^2$ $r^3$, that swing, respectively, upon the stubble and grain sides of the knotter-actuating shaft I. A discharge-arm, R², is hinged to and suspended from the end of the bracket R, and a rod, $r^4$, connects the arm $r^2$ of the lever R' with the discharge-arm R², so that both are swung together in lines nearly parallel to each other. A roller, $i$, upon the delivery-arm I' presses against the adjacent sides of the arms $r^2$ $r^3$ of the lever R', and thus serves to vibrate the arm R' and discharge-arm R² both forward and backward at each revolution of the delivery-arm.

When the lever R' and discharge-arm R² are drawn toward the grain side of the machine, they are held in an elevated position out of the way of the bundle during its delivery by a spring-plate, R³, secured to the picker-sill F², and extend toward the stubble side of the machine beneath the knotter-actuating shaft. The end of the spring-plate is crooked to interlock with a pin, $r^5$, extending from the end of the lever R', and hold the lever up until discharged therefrom by the pressure of the roller of the delivery-arm against it. The grain is raised up the inclined binder-table and delivered to the needle-arm by means of oscillating packers W W, of well-known construction, arranged upon opposite sides of the binder-needle, and a third arm, W', arranged at the rear end of the table and connected and operated by a crank on the packer-shaft, to act upon the heads of the grain and lift them up to the inclined surface of the table. The packers are suspended at one end by links $w$, pivoted beneath the binder-frame, and are acted upon intermediately of their length by continuously-operating crank-arms revolving with the main binder-shaft. The butt-ends of the grain are acted upon by a butter of peculiar construction, which acts not only to even up the grain, but to aid in raising it up the inclined surface of the binder-table and adjust its delivery to the binder-arm to compensate for the varied length of grain and for the adjustments of the binder-table incident thereto. The butter is formed of a finger-bar, Y, consisting of a rod or bar having a hand-shaped plate, $y$, preferably formed of sheet metal, secured to its lower end, and a rod, $y'$, secured to its upper end. The rod $y'$ passes through a swivel-block, Y', pivoted to the binder-table, through which the rod freely slides, and may have an oscillating movement. The crank-arm $y^2$ of a short shaft, $y^3$, is connected to the bar Y intermediately of its length, by which means the bar is given an endwise-moving oscillatory motion. The crank-shaft $y^3$ is provided with a beveled pinion, $y^4$, upon its upper end, that gears with and is driven by a similar pinion, $y^5$, that is feathered to the conveyer-shaft to move lengthwise therein and be revolved by said shaft. The shaft $y^3$ is held in bearings $y^6$, secured to a post, Y², supported upon the shoe or main platform frame, so that the butter may be held in a fixed relation to the main frame when the binder-frame is adjusted. A finger, $y^7$, connects the top of the post Y² with the bearing-bracket $y^6$, as shown, to hold it steadily when the shaft is moved lengthwise through it. A butter-board, Y³, is narrowed down to pass beneath the conveyer-shaft, and is hinged at its lower end to the plate $y$ of the finger-bar, and the upper end of the board is connected by a link, $y^8$, with the lower end of a lever-arm, Y⁴, pivoted to the under side of the binder gear-sleeve G', and extending toward the stubble side of the machine within reach of the driver in his seat. An arc, $y^9$, is secured to the sleeve G', upon which the lever may be adjusted, and the upper end of the butter-board shifted to suit the length of grain or to retain its proper relation to the lower end of the finger-bar, which remains stationary with the main frame when the binder-frame is adjusted upon it. The upper end of the inclined binder-table is provided with a bracket or horizontal leaf, T, secured thereto to extend across and above the drive-wheel, over which the bundle may be readily discharged by the arm R², suspended and vibrating above it. The driver's seat S is supported upon an inclined bar, S', secured to the end of an upright bar, S², bolted to the stubble side and front end of the wheel-frame A². The seat may thus be arranged above the wheel upon the stubble side thereof, with sufficient space between it and the leaf T of the binder-table for the bundle to be discharged from the machine between them and within reach of the driver from his seat should the bundle become choked or entangled.

The binder-frame may be readily adjusted upon the tubular longitudinal bars B B' of the main frame by means of a lever, X, connected to a lug, $x$, on the strap that secures the intermediate rail, B³, to the upper bar, B', by means of a rod, X', pivoted at its front end to the lever X, and hooked to the lug $x$ at its rear end. A segment toothed bracket, X², on the grain side of the main wheel frame A², provides simple means for holding the lever and binder-frame in its adjusted position. A receiving-tray, U, is formed with a leaf, U', secured at an angle thereto, to prevent the bundle from rolling off the tray before it is dumped. The receiving-tray is bolted to an axle, $u$, journaled to bearings upon the reel-frame A³, so that it will be arranged below the plane of the axle and immediately behind the driving-wheel. The front end of the tray is connected to a link, $v$, to the end of the elbow V' of the hand-lever V, pivoted to the upright seat-bar S²; and arranged within convenient reach of the driver, by which means the tray may be readily dumped when desired. The arrangement of the driving-wheel in advance of the central line of the binder-table, the inclined arrangement of the binder-table between the grain-platform and the drive-wheel, to terminate below the top and upon the inner side of the drive-wheel, and the pickers supported at their forward end only to overhang the foot of the inclined binder-table, will admit of a clear unobstructed space over which the grain may be elevated; and the angle of the binder-table being considerably depressed, the grain and bound bundle need not be elevated entirely over the wheel, but will be discharged in the space immediately in rear of the wheel.

The operation of the various devices herein described will be readily understood, as they principally constitute improvements upon well-known devices not broadly claimed herein.

Having now described my invention, what I claim as new is—

1. The combination of the inclined binder-table arranged between the drive-wheel and grain-platform, the rotary pickers arranged above said table, between the grain-platform and binder-packers, and the oscillating arm arranged beneath and at the rear end of said binder-table, and in the front of said rotary pickers, operated from a crank on the packer-shaft, for moving the rear end of the grain beyond the reach of the conveyers in its passage to the needle, and a yielding retaining-plate arranged above said table, substantially as described.

2. The platform-carrier formed of teeth secured to an endless belt or chain, in combination with an inclined tooth-clearer, E, for each belt, that overlaps the lower edges of the inclined binder-table, said tooth-clearer being formed and consisting of a plate secured to the platform-frame, provided with a transverse slot, through which the teeth may pass, and an upturned inclined edge, $e^2$, that bears closely against the sides of the teeth, substantially as and for the purpose described.

3. The combination of the inclined binder-table arranged below the top of the drive-wheel, with its outer end close to the vertical plane of the inner side of the drive-wheel, the platform-carriers secured to the platform, an inclined tooth-clearer for each belt, overlapping the lower edge of the binder-table, and provided with an upturned inclined edge, $e^2$, that bears closely against the sides of the teeth, and the rotary toothed pickers arranged to overhang the lower end of the table, above the tooth-clearers, to receive the grain therefrom, substantially as described.

4. The combination, in a grain-binder, of the platform, the platform carriers and rollers driven by gearing from the driving-wheel, and the stop mechanism consisting of an oscillating crank-shaft actuated at one end from the oscillating needle-arm shaft, and actuating at its other end a clutch to stop and start the picker-shaft, substantially as described.

5. In a grain-binder, the combination of the inclined binder-table arranged below the top of the drive-wheel, with its outer end close to the vertical plane of the inner side of the drive-wheel, with continuously-operating packers, and rotary pickers suspended above and at the lower part of the inclined table, and adapted to move the grain up to the packers, a clutch secured to the picker-shaft, and connected with the binder mechanism, to connect and disconnect at suitable intervals.

6. The combination of the binder-shaft provided with a fixed sprocket-wheel, the picker-shaft provided with a sprocket-wheel connected with its shaft by a clutch, the reel-gear revolving upon a stud-axle overhanging the picker-shaft, and the sprocket-wheel affixed thereto, the chain connecting said sprocket-wheels, and the pendent clutch-lever connected with and operated upon by the needle and knotter actuating mechanisms, substantially as and for the purpose described.

7. The combination, with the oscillating needle, of a needle-guard provided with a sliding and folding extension to form a cut-off for the inflowing grain, substantially as and for the purpose described.

8. The oscillating needle provided with a guard extending in the direction of the path of said needle, in combination with an extension-piece arranged to slide upon said guard, to form a cut-off for the flowing grain, and fold upon the guard when it is retracted, substantially as and for the purpose described.

9. In a grain-binder, the combination, with the trip-finger operated by the pressure of the grain, of the rock-shaft for operating the clutch mechanism provided with a hammer-extension and an anvil-plate to receive the force of the blow, substantially as and for the purpose described.

10. The combination, with the trip-finger, of the rock-shaft, the arm on the rock-shaft connected with the finger, the arm on said shaft connected with the trip-arm, formed with an elbow or hammer-extension arranged to operate upon the anvil-plate of the binder-gear, substantially as and for the purpose described.

11. The combination of the overhung bracket secured to the knotter-shaft sleeve, the revolving delivery-arm, the suspended lever, the connecting-rod, and the pendent discharge-arm, said lever and discharge-arm being pivoted to the overhung bracket, substantially as and for the purpose described.

12. The combination of an overhung bracket, the delivery-arm, the discharge-arm, and the suspended lever connected to the discharge-arm, and formed of two downwardly-projecting arms, that are actuated, alternately, by a projection or roller upon the discharge-arm, substantially as and for the purpose described.

13. The combination of the bracket, the delivery-arm, the discharge-arm, the suspended lever connected to the discharge-arm, and the detent-spring crooked at its end, to engage with and support the suspended lever and discharge-arm, substantially as and for the purpose described.

14. The combination and arrangement, substantially as described, of the grain-platform, the inclined binder-table, the drive-wheel, the bundle-carrier, the tilting lever, and a driver's seat arranged upon the stubble side of and above the wheel and bundle-carrier, so as to overhang the space through which the bundle is ejected, substantially as described.

15. The combination, with the frame of the machine, of the reel-standard supported on the platform or inside shoe, the reel-shaft adjusted vertically upon the end of the reel-standard, and the braces connecting the reel-shaft with one or more brackets secured to the overhung binder-frame, substantially as and for the purpose described.

16. The combination of the shoe, the reel-standard, the braces secured to the reel-post, the crank-shaft, the pivotal bracket, and segment-rack secured to the binder-frame, these parts being combined and arranged for joint operation, to adjust the reel both vertically and horizontally, substantially as described.

17. The combination of the main frame, the inclined adjustable binder-frame, the intermittently-operating pickers interposed between the platform-carrier and the packers, and the oscillating butter operated intermittently by gearing from the picker-shaft, all arranged and operating substantially as described.

18. The combination of the main frame, the binder-table, the oscillating butter-bar provided with fingers at its lower end, and the wing-board hinged to the lower end of the butter-bar, and connected by a link at its upper end with an adjustable hand-lever, substantially as described.

19. The combination of the main frame, the adjustable binder-table, the oscillating butter-bar provided with fingers, and held at its lower end in a fixed position relative to the cutter-bar, and a wing-board hinged to the butter-bar at its lower end, and connected at its upper end by a link and lever with the adjustable binder-table frame, substantially as described.

In testimony whereof I have hereunto set my hand this 22d day of June, A. D. 1883.

JOHN F. SEIBERLING.

Witnesses:
 REX. SMITH,
 EDW. W. DE KNIGHT.